US010416863B2

(12) United States Patent
Kaieda

(10) Patent No.: US 10,416,863 B2
(45) Date of Patent: Sep. 17, 2019

(54) IMAGE MEASURING APPARATUS AND USER INTERFACE FOR MANAGEMENT OF CALIBRATION OF IMAGE MEASURING APPARATUS

(71) Applicant: MITUTOYO CORPORATION, Kanagawa (JP)

(72) Inventor: Makoto Kaieda, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 343 days.

(21) Appl. No.: 14/795,092

(22) Filed: Jul. 9, 2015

(65) Prior Publication Data
US 2016/0018976 A1    Jan. 21, 2016

(30) Foreign Application Priority Data

Jul. 16, 2014    (JP) .................................. 2014-145814

(51) Int. Cl.
| | | |
|---|---|---|
| G06F 3/048 | (2013.01) | |
| G06F 3/0484 | (2013.01) | |
| G02B 7/14 | (2006.01) | |
| G06F 3/0482 | (2013.01) | |

(Continued)

(52) U.S. Cl.
CPC ........... *G06F 3/04847* (2013.01); *G02B 7/14* (2013.01); *G06F 3/0482* (2013.01); *G06F 3/0486* (2013.01); *G06F 3/04817* (2013.01); G06F 2203/04803 (2013.01)

(58) Field of Classification Search
None
See application file for complete search history.

(56) References Cited

U.S. PATENT DOCUMENTS

| | | | | |
|---|---|---|---|---|
| 5,416,575 A | * | 5/1995 | Schwartz | ............. G01N 21/278 356/243.1 |
| 2001/0028391 A1 | * | 10/2001 | Iko | ........................ G02B 21/365 348/110 |

(Continued)

FOREIGN PATENT DOCUMENTS

| | | |
|---|---|---|
| JP | 2001-281554 | 10/2001 |
| JP | 2004-4856 | 5/2007 |

OTHER PUBLICATIONS

"HD Pentax-DA 55-300mm F4-5.8 ED WR Review", https://web.archive.org/web/20140131095415/https://www.pentaxforums.com/reviews/hd-pentax-da-55-300mm/magnification.html, Jan. 31, 2014, 6 pages.*

*Primary Examiner* — Andrey Belousov
*Assistant Examiner* — Haimei Jiang
(74) *Attorney, Agent, or Firm* — Greenblum & Bernstein, P.L.C.

(57) ABSTRACT

An image measuring apparatus including an image measurer capable of switching between one of a type of lens and a magnification power, the image measurer obtaining an image of a measured object; a display displaying the image obtained by the image measurer and providing an operation screen to a user; and a controller controlling operations of the image measurer and the display. A calibration value and an expiration date for the calibration value are recorded by the controller for one of each type of lens and each magnification power. The controller communicates to the user, using the display, that one of the lens and the magnification power has an expired calibration value.

16 Claims, 15 Drawing Sheets

(51) Int. Cl.
G06F 3/0486 (2013.01)
G06F 3/0481 (2013.01)

(56) References Cited

U.S. PATENT DOCUMENTS

| | | | | |
|---|---|---|---|---|
| 2006/0155612 | A1* | 7/2006 | Haeberli | G06Q 30/0621 |
| | | | | 705/26.5 |
| 2009/0087177 | A1* | 4/2009 | Uchida | G02B 21/365 |
| | | | | 396/432 |
| 2012/0110503 | A1* | 5/2012 | Mahoney | G06T 11/60 |
| | | | | 715/810 |
| 2014/0028819 | A1* | 1/2014 | Nakano | A61B 1/00009 |
| | | | | 348/65 |
| 2014/0278144 | A1* | 9/2014 | Risk | G01N 21/3504 |
| | | | | 702/24 |
| 2014/0337734 | A1* | 11/2014 | Bradford | G06Q 10/00 |
| | | | | 715/719 |
| 2015/0301732 | A1* | 10/2015 | Henderson | G01N 35/00 |
| | | | | 715/769 |

* cited by examiner

Fig. 1

| | Lens type | Lens information (Magnification/Numerical aperture/SN) | Calibration values | Calibrator | Calibration date | Expiration date | Revolver slot |
|---|---|---|---|---|---|---|---|
| 1 | M Plan Apo 2x | 2.0/ 0.05500/ C000000001 | X:0.0038340 Y:0.0038340 | ○○○ | 2014/3/4 | 2015/3/4 | A |
| 2 | M Plan Apo 5x | 5.0/ 0.05500/ C000000011 | X:0.0038340 Y:0.0038340 | ○○○ | 2014/3/4 | 2015/3/4 | B |
| 3 | M Plan Apo 10x | 10.0/ 0.05500/ C000000001 | X:0.0038340 Y:0.0038340 | ○○○ | 2014/3/4 | 2015/3/4 | C |
| 4 | M Plan Apo 20x | 20.0/ 0.05500/ C000000011 | X:0.0038340 Y:0.0038340 | ○○○ | 2014/3/4 | 2015/3/4 | |
| 5 | M Plan Apo 50x | 50.0/ 0.05500/ C000000012 | X:0.0038340 Y:0.0038340 | ○○○ | 2013/2/4 | 2014/2/4 | |
| 6 | M Plan Apo 100x | 100.0/ 0.05500/ C000000005 | X:0.0038340 Y:0.0038340 | ○○○ | 2014/3/4 | 2015/3/4 | |
| 7 | M Plan Apo SL 20x | 20.0/ 0.05500/ C000000011 | X:0.0038340 Y:0.0038340 | ○○○ | 2014/3/4 | 2015/3/4 | |
| 8 | M Plan Apo SL 50x | 50.0/ 0.05500/ C000000012 | | ○○○ | | | |
| 9 | M Plan Apo SL 100x | 100.0/ 0.05500/ C000000005 | | | | | |

Fig. 11

| | Lens type | Magnification/Numerical aperture/SN | Calibration values | Calibrator | Calibration date | Expiration date | |
|---|---|---|---|---|---|---|---|
| 1 | M ZoomX | 0.5/ 0.02400/ C000000001 | X : 0.0149400<br>Y : 0.0149400 | ○○○ | 2014/3/4 | 2015/3/4 | ✓ |
| 2 | M ZoomX | 0.65/ 0.03040/ C000000011 | X : 0.0123200<br>Y : 0.0123200 | ○○○ | 2014/3/4 | 2015/3/4 | |
| 3 | M ZoomX | 0.85/ 0.03720/ C000000001 | X : 0.0089370<br>Y : 0.0089370 | ○○○ | 2014/3/4 | 2015/3/4 | |
| 4 | M ZoomX | 1.00/ 0.04050/ C000000011 | X : 0.0076830<br>Y : 0.0076830 | ○○○ | 2014/3/4 | 2015/3/4 | |
| 5 | M ZoomX | 1.50/ 0.05150/ C000000012 | X : 0.0051630<br>Y : 0.0051630 | ○○○ | 2013/2/4 | 2014/2/4 | |
| 6 | M ZoomX | 2.00/ 0.06020/ C000000005 | X : 0.0038930<br>Y : 0.0038930 | ○○○ | 2014/3/4 | 2015/3/4 | |
| 7 | M ZoomX | 2.50/ 0.06760/ C000000011 | X : 0.0031210<br>Y : 0.0031210 | ○○○ | 2014/3/4 | 2015/3/4 | |
| 8 | M ZoomX | 3.50/ 0.08000/ C000000012 | X : 0.0022070<br>Y : 0.0022070 | | | | |
| 9 | | | | | | | |

-- PRIOR ART --

-- PRIOR ART --

IMAGE MEASURING APPARATUS AND USER INTERFACE FOR MANAGEMENT OF CALIBRATION OF IMAGE MEASURING APPARATUS

CROSS-REFERENCE TO RELATED APPLICATIONS

The present application claims priority under 35 U.S.C. § 119 of Japanese Application No. 2014-145814, filed on Jul. 16, 2014, the disclosure of which is expressly incorporated by reference herein in its entirety.

BACKGROUND OF THE INVENTION

1. Field of the Invention

The present invention relates to an image measuring apparatus. Specifically, the present invention relates to a graphical user interface (GUI) supporting an operation by a user to switch between lenses in an image measuring apparatus making use of a microscope that can switch between lenses of various types and magnifications.

2. Description of Related Art

Image measuring apparatuses are known which perform shape observation and dimension measurements of a work piece (measured object) 1 (for example, Japanese Patent No. 3917952, Japanese Patent Laid-open Publication No. 2001-281554). FIG. 14 illustrates a system configuration of an image measuring apparatus. The image measuring apparatus includes an image measuring device (image measurer) 2 and a control computer 50. The image measuring device 2 is equivalent to a microscope. The image measuring device 2 includes a base portion 10, a stage 12, a lens assembly 17, and a CCD camera 3. The base portion 10 includes a foundation 11, and a support rail 16 rising to extend upward from the foundation 11. The work piece (measured object) 1 is placed on the stage 12, which is capable of displacement in X, Y, and rotational directions using an X direction adjustment handle 13, a Y direction adjustment handle 14, and a stage rotation knob 15, respectively.

The lens assembly 17 is supported by the support rail 16 so as to be capable of vertical movement. The lens assembly 17 includes a revolver 18 on a side facing the work piece (measured object) 1, and is configured such that a field lens can be attached and detached with respect to each of a plurality of attachment slots on the revolver 18. In this example, the revolver 18 has four slots. The revolver 18 is rotated electrically or manually, thereby switching between the field lenses. In this example, four field lenses 19a, 19b, 19c, and 19d each having a different magnification power are mounted to the revolver 18.

The lens assembly 17 includes an eyepiece 20 on an upper portion thereof, which the lens assembly 17 connects optically to the field lenses 19a to 19d via an upright trinocular barrel 21. The lens assembly 17 is capable of adjusting vertical movement through manual operation of the handles 22 and 23, or can be electrically driven.

The CCD camera 3 is mounted on the upper portion of the upright trinocular barrel 21.

The control computer 50 includes a host computer 60 and an inputter/outputter 70. The inputter/outputter 70 includes a touch panel display 71, a keyboard 72, and a mouse 73.

The host computer 60 is a computer configured by a CPU and memory. The host computer 60 processes image data obtained by the CCD camera 3 and displays results of the processing on the touch panel display 71. In addition, the host computer 60 switches between the field lenses (19a to 19d) by rotating the revolver 18 in response to an operation input by a user, performs focusing, and the like.

When observing a shape and measuring dimensions of a work piece (measured object) using image measurement, the user must specify which lens is currently being used and instruct the host computer 60 of this information (make a setting on the host computer 60). This is because when a magnification power or the like of the lens currently in use is not specified, the host computer 60 cannot calculate the dimensions of the work piece from the image data.

Given this, a GUI screen such as that shown in FIG. 15, for example, is provided to the user as a screen to input and define lens information. This GUI screen performs display on the touch panel display 71 according to display control performed by the host computer 60. The user performs an information input or selection operation on the GUI screen by performing a touch operation on the touch panel display 71, or by performing keyboard input or mouse operation.

A configuration of the GUI screen shown in FIG. 15 is briefly described. The GUI screen shown in FIG. 15 is referred to as a "lens selection screen 200." The lens selection screen 200 includes a revolver information display region 210 and a lens information display region 250. The revolver information display region 210 displays which lens is mounted to which slot in the revolver 18. The letters "A," "B," "C," and "D" arranged in a vertical line on a left side of the revolver information display region 210 are identifiers (220) for each slot in the revolver 18. Naturally, the identifiers "A," "B," "C," and "D" for each slot are engraved into the revolver 18, or the like, so as to enable the user to know the identifier for each slot.

Beside each identifier is a lens name display frame 230 corresponding to each identifier. The lens name display frame 230 displays a name (type) of the lens mounted to the corresponding slot in the revolver 18. The user may directly enter the name into the lens name display frame 230 by typing, or may select the lens name from a list provided in a drop-down format. Although not illustrated in detail, when the user clicks on a downward triangle 231 on a right end of each lens name display frame 230, a list of lens names available for use is displayed as a drop-down list. Typically, the user has a stock of various kinds of lenses readily available. When performing image measurement of the work piece, the user selects several (for example, four) lenses to be used in the image measurement from among the stock of readily available lenses and mounts each lens to a slot in the revolver 18. When each lens is mounted to a slot in the revolver 18, the lens name display frame 230 displays which lens is mounted to which slot.

A radio button 240 corresponding to the identifier 220 of each slot is provided between the slot identifier 220 and the lens name display frame 230. The radio button 240 in an ON state (black dot in the center of the circle) represents the slot that is linked to the CCD camera 3, out of all the slots in the revolver 18. In other words, the radio button 240 in the ON state indicates the lens currently being used. The user can switch the lens being used by switching the selection of the radio button 240.

Information for the lens currently being used is displayed in the lens information display region 250. In addition to lens information such as a lens name (251) and a serial number (252), the lens information display region 250 also displays optical performance information (260) and calibration value information (270). The optical performance information 260 includes magnification power 261 and numerical aperture 262. The calibration value information 270 includes actual length per pixel (271) and optical axis offset (inclination of the optical axis) (272). These calibration values are obtained ahead of time, and are input into the host computer 60 and stored. (Although not described in detail, a separate GUI screen may be provided in which the calibration values for each lens are found efficiently, then entered and stored.) When the user selects the lens (changes any of the radio buttons 240 to ON), the host computer 60 retrieves the corresponding lens calibration values from the memory and displays the values in the lens information display region 250.

In a case where the revolver 18 is electric, the revolver 18 rotates automatically in accordance with the lens selection. For example, when the user presses a "CONFIRM" button 201, the revolver 18 automatically rotates such that the lens selected by the radio button 240 becomes usable.

When performing image measurement, correctly setting the calibration values for the lens is essential. When the calibration values are incorrect, an incorrect measured value may be output. Accordingly, although of course the correct calibration values for each lens are found, maintenance and oversight are required to ensure the calibration values remain correct.

In this regard, a scenario is presented in which an image measuring apparatus is used. A user of the image measuring apparatus may be a parts processing company or a research laboratory, for example, where a plurality of people often share use of a single image measuring apparatus. There may be cases where a task of calibrating each lens is always performed by a designated person in charge of calibration, or where the task of calibrating each lens is performed by each user whenever required. In either such case, however, it may be difficult for the various users to know whether calibration has been performed, or whether the registered calibration values are valid. When a lens maintenance log or the like is prepared, the user may be able to tell who performed calibration and when by referring to the log each time. However, this is rather burdensome. In the case of a user who has not mastered using the image measuring apparatus, the user may inadvertently use a lens with incorrect calibration values. Such a mistake may be treated as an erroneous operation for which the user is responsible. However, when the user continues on to subsequent stages of a process based on the incorrect measured values, results are produced which are not favorable for the user, and therefore a mechanism to prevent such erroneous operation from occurring in the first place is still beneficial.

SUMMARY OF THE INVENTION

An advantage of the present invention is to provide an image measuring apparatus that is easier to use and more user-friendly. More specifically, the present invention provides an image measuring apparatus GUI program which achieves an image measuring apparatus that is easier to use and more user-friendly.

An image measuring apparatus according to the present invention includes an image measuring device capable of switching between one of a type of lens and a magnification power, the image measuring device obtaining an image of a measured object; a display displaying the image obtained by the image measuring device and providing an operation screen to a user; and a controller controlling operations of the image measuring device and the display. A calibration value and an expiration date for the calibration value are recorded by the controller for one of each type of lens and each magnification power. The controller communicates to the user, using the display, that one of the lens and the magnification power has an expired calibration value.

In the present invention, when one of the lens and the magnification power having the expired calibration value is selected by the user, the controller preferably communicates to the user that the calibration value is expired.

In the present invention, the operation screen preferably includes a directory display region providing a directory display of one of a lens and a magnification power that can be used in the image measuring device; and a mounted lens display region displaying one of the lens and the magnification power mounted to the image measuring device. When the controller detects that an image, symbol, or sequence of letters corresponding to one of the lens and the magnification power displayed in the directory display region has been moved to the mounted lens display region by a drag-and-drop operation, the controller preferably registers the one of the lens and the magnification power as the mounted lens. Moreover, in a case where the one of the lens and the magnification power has an expired calibration value, the controller preferably performs a display to communicate to the user that the calibration value is expired.

In the present invention, the operation screen preferably includes a directory display region providing a directory display of one of a lens and a magnification power that can be used in the image measuring device; and a mounted lens display region displaying one of the lens and the magnification power mounted to the image measuring device. In a case where one of the lens and the magnification power has an expired calibration value, the controller preferably communicates to the user in the directory display region, using the display, that the one of the lens and the magnification power has an expired calibration value.

In the present invention, the image measuring apparatus preferably communicates to the user, using highlighting or a message displayed on the display, that one of the lens and the magnification power has an expired calibration value.

In the present invention, a thumbnail is preferably displayed on the display for one of each type of lens and each magnification power. Each thumbnail preferably displays one of an image in which a size of a prearranged reference pattern is adjusted to match each magnification power, and an image in which a size of an image currently being captured is adjusted to match each magnification power.

An image measuring apparatus GUI program according to the present invention for an image measuring apparatus that includes: an image measuring device capable of switching between one of a type of lens and a magnification power, the image measuring device obtaining an image of a measured object; a display displaying the image obtained by the image measuring device and providing an operation screen to a user; and a controller controlling operations of the image measuring device and the display. The image measuring apparatus GUI program performs display control on the display by being programmed into the controller of the image measuring apparatus. The program retrieves from the controller information in which a calibration value and an expiration date of the calibration value are recorded for one of each type of lens and each magnification power, and communicates to the user, using the display, that one of the lens and the magnification power has an expired calibration value.

According to the present invention, an image measuring apparatus that is easier to use and more user-friendly can be provided.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates an exemplary lens information table;

FIG. 11 illustrates an exemplary lens information table according to a third modification;

DETAILED DESCRIPTION OF THE INVENTION

Figure 2:
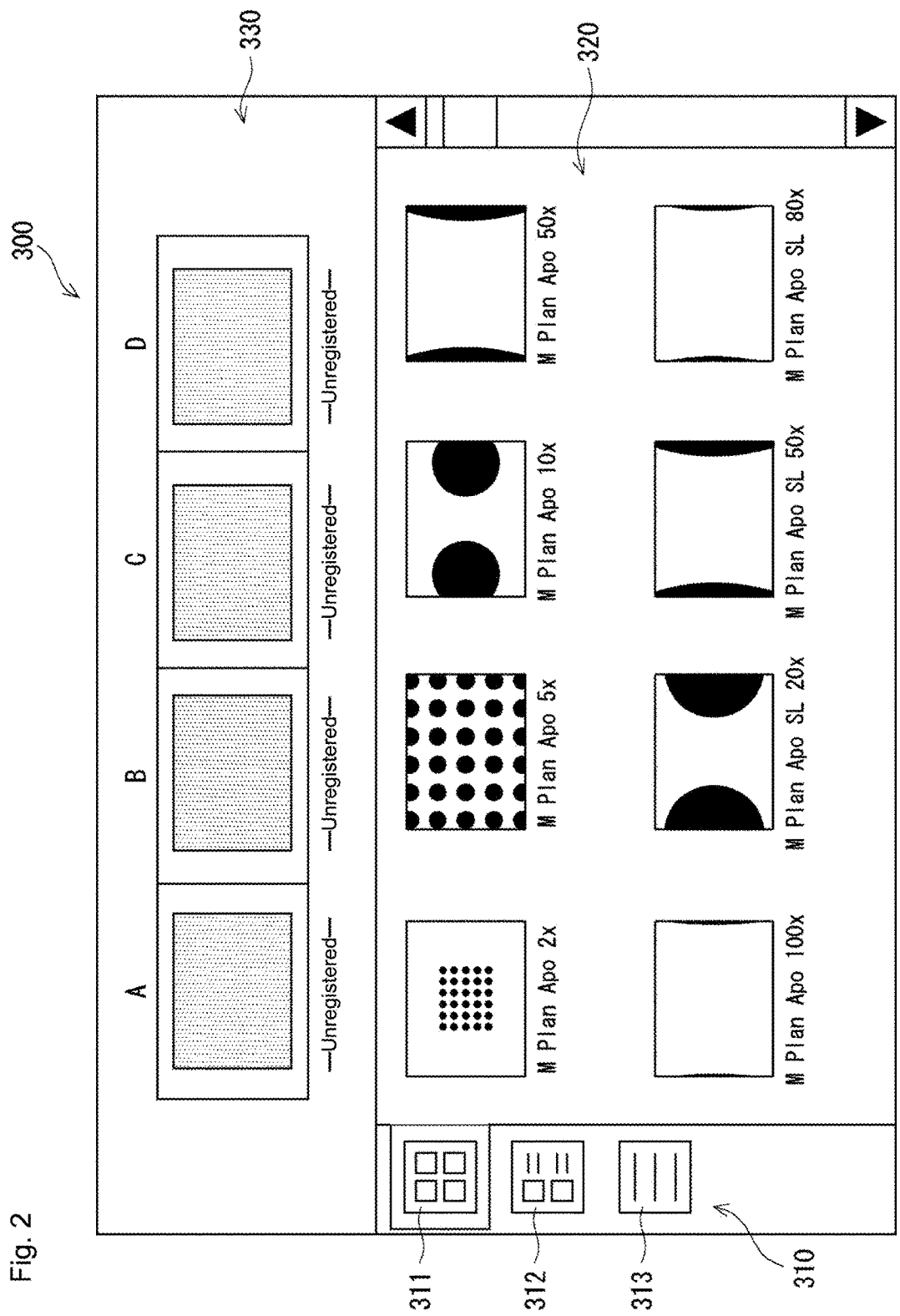
FIG. 2 illustrates an exemplary configuration of a lens selection GUI screen.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

A description of the embodiment of the present invention is given with reference to the drawings and to the reference numerals assigned to each component in the drawings. A first embodiment of the present invention is described with reference to the drawings. A screen in a GUI utilized in a lens selection operation is described as the first embodiment with reference to FIGS. 2 to 8. The GUI screen is referred to as a lens selection GUI screen. The lens selection GUI screen performs display operations, described below, which are achieved by an image measuring apparatus GUI program stored in a host computer 60. The host computer 60 includes a CPU and a memory, and performs display control of the lens selection GUI screen by running the image measuring apparatus GUI program stored in the memory.

Prior to describing the display operations of the lens selection GUI screen, a lens information table required during display is described. FIG. 1 illustrates an exemplary lens information table. Numbers printed outside a left column of the table are presented to facilitate description and need not be included. In order from left to right, "lens type," "lens information," "calibration values," "calibrator," "calibration date," and "expiration date" can be recorded in the table. The table further includes a column recording "revolver slot" and a "flag" column to indicate which lens is in use.

"Lens type" is substantially synonymous with a lens name. "Lens information" refers to optical information of the lens, such as magnification power, numerical aperture, signal-to-noise (SN) ratio, and the like. This information is provided by a lens manufacturer. The "lens type" and "lens information" may be registered for a stock of lenses readily available to a user, as well as for all lenses capable of being used in an image measuring device 2.

"Calibration values" is data for calibration values found for each lens. In this example, the calibration values are an actual length per pixel. When finding the calibration values, the image measuring device 2 is actually set up and a calibration task is performed with the lens being calibrated mounted to a revolver 18. When the calibration values are found, the information is registered in the lens information table. At that point, a name of a person performing the calibration and the date when the calibration was performed are registered together with the calibration values. An expiration date for the calibration is also registered.

Calibration must be performed on a regular schedule, e.g., once a month, every six months, or every year. In the example shown in FIG. 1, the expiration period of the calibration is set to one year. The fifth lens from the top is treated as expired. (The relevant portion is circled in the table shown in FIG. 1 for ease of reference.) Moreover, no calibration values have been entered for the eighth or ninth lenses. These conditions may suggest the following scenario, for example. Although the eighth and ninth lenses are lenses that can be used with the image measuring device 2 and are sold by lens manufacturers, the user has not yet obtained the lenses and so there are no calibration values for either lens.

The column recording "revolver slot" indicates to which revolver slot a particular lens has been mounted. The example illustrated in FIG. 1 shows that a first lens is mounted in slot A, a second lens is mounted in slot B, and a third lens is mounted in slot C. The user registers this information in the lens information table after attaching (mounting) the lens to the revolver slot. A registration operation is executed on the lens selection GUI screen. This operation is described later.

The "flag" column indicating which lens is in use contains a flag identifying which lens is currently in use. When the user switches the lens in use, that information is registered in the lens information table. The registration operation is executed on the lens selection GUI screen, and is described later.

Next, display operations of the lens selection GUI screen according to the first embodiment are described with reference to FIGS. 2 to 8. In order to facilitate the description that follows, two points are to be raised at this juncture regarding characteristic advantages of the first embodiment. However, the advantages of the first embodiment are naturally not limited to these.

(1) When attempting to register a lens with expired calibration values as a mounted lens, the user receives a warning with an easily understood color (highlighting) or the like. As a result, a misoperation in which a lens having incorrect calibration values is used in a measurement can be prevented from occurring.

(2) Displaying a thumbnail (reduced image) corresponding to each lens facilitates intuitive understanding of an observation field of each lens. As a result, measurement efficiency can be expected to improve drastically.

A detailed description now follows. FIG. 2 illustrates an exemplary configuration of a lens selection GUI screen 300. In FIG. 2, the lens selection GUI screen 300 is broadly divided into three regions. A bottom, left-edge region is a "display format selection region 310;" a region occupying a majority of a bottom portion (except the portion occupied by the "display format selection region 310") is a "directory display region 320;" and a top portion is a "mounted lens display region 330."

Three icons 311, 312, and 313 are presented in the display format selection region 310 enabling selection of a display format for the directory display region 320. The three icons 311, 312, and 313 are aligned vertically and each icon is, in order from top to bottom, a thumbnail compendium format icon 311, a detailed display format icon 312, and a simplified display format icon 313. FIG. 2 illustrates a state where the thumbnail compendium format (311) is selected. Accordingly, a thumbnail compendium is displayed in the directory display region 320. When the detailed display format (312) is selected, the screen resembles that shown in FIG. 7, and when the simplified display format (313) is selected, the screen resembles that shown in FIG. 8. This will be discussed below. Each of the icons 311, 312, and 313 is designed to match the respective display format and to be readily understood.

A plurality of lenses are displayed in a compendium format in the directory display region 320. In addition to the stock of lenses readily available to the user, candidate lenses provided by a manufacturer and capable of being used in the image measuring device 2 are displayed in a compendium. Specifically, the lens types registered in the lens information table (FIG. 1) are all displayed in the directory display region. In a case where a single screen is insufficient to display all lenses, the directory display region is configured such that the remaining lens information is displayed by scrolling.

In FIG. 2, the thumbnail compendium format (311) is selected. Therefore, a thumbnail compendium is displayed. In the thumbnail compendium format, a thumbnail (reduced image) is displayed, and a lens name is displayed below each thumbnail. The thumbnail is a graphic image corresponding to a magnification power of the lens. The graphic displayed as the thumbnail is an image where a prearranged pattern is expanded or reduced in accordance with the magnification power of each lens. In the example of FIG. 1, a pattern of dots arranged in a grid is used as the reference pattern, and a size of the pattern is adjusted to conform with the magnification power of each lens. Looking at the thumbnail (reduced image), the magnification power of the lens can be intuitively understood.

Figure 3:
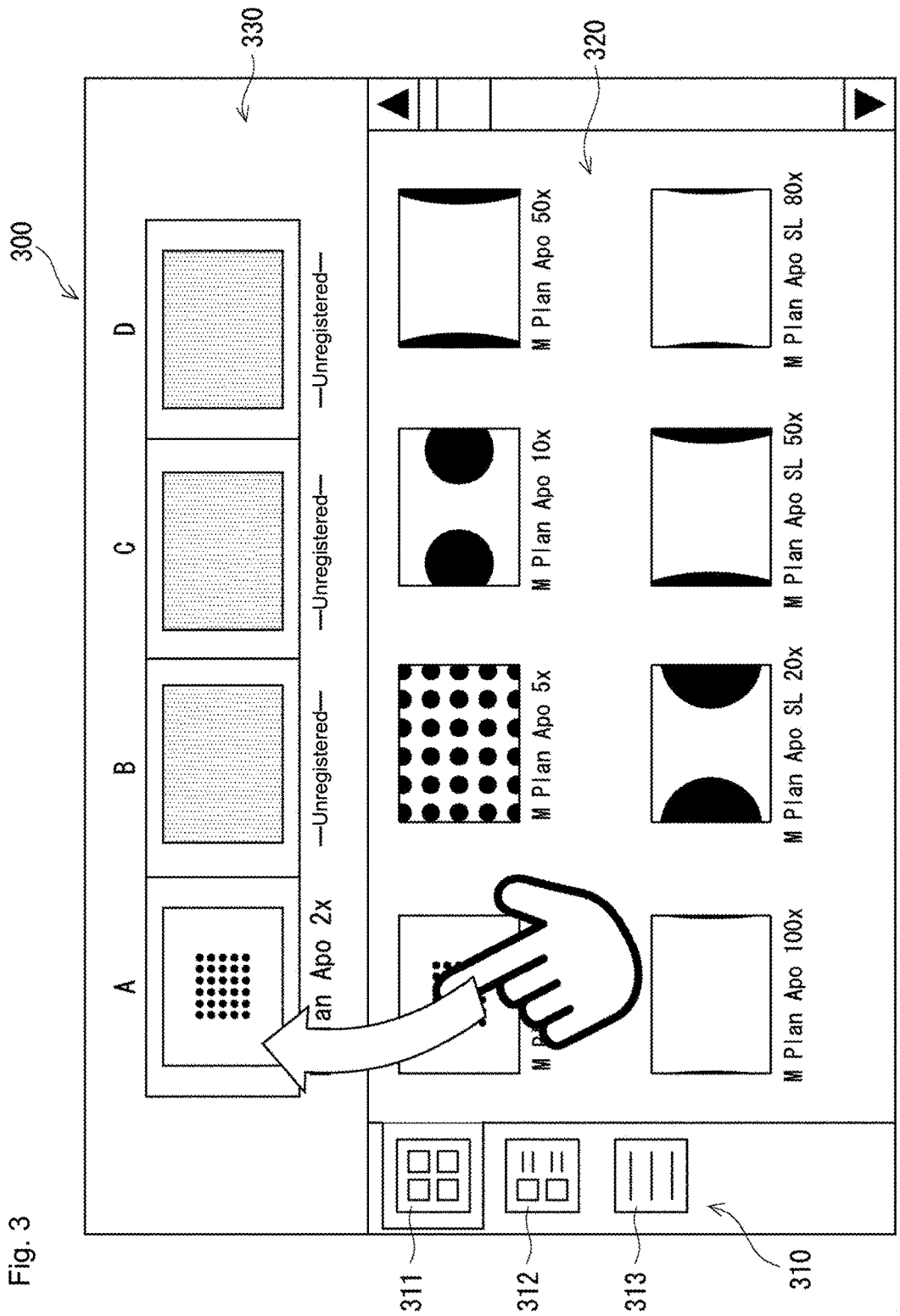
FIG. 3 illustrates an exemplary operation on the lens selection GUI screen.

The lenses attached (mounted) to the revolver 18 are displayed in the mounted lens display region 330. The revolver 18 includes four slots A, B, C, and D. Therefore, the mounted lens display region 330 also includes four display frames corresponding to A, B, C, and D. In the beginning of image measurement, the user selects several readily available lenses from the stock of lenses to be used in measurement (observation) and attaches the lenses to the revolver 18. The user registers this information in the lens information table after attaching (mounting) the lens to the revolver slot. The registration is performed as follows on the lens selection GUI screen 300. In this example, a lens named "M Plan Apo 2×" is mounted to slot A. The user locates "M Plan Apo 2×" in the directory display region. As shown in FIG. 3, the user drags and drops the thumbnail for "M Plan Apo 2×" into the display frame "A" in the mounted lens display region 330.

As a result, as shown in FIG. 3, the thumbnail for "M Plan Apo 2×" is displayed in the display frame "A" in the mounted lens display region 330. An emphasis display is simultaneously placed on "M Plan Apo 2×" in the directory display region 320 to convey that "M Plan Apo 2×" has been registered (see FIG. 4). Examples of the emphasis display may include thickening the frame around the thumbnail for "M Plan Apo 2×," changing its color, or changing a background color. The fact that "M Plan Apo 2×" has been mounted in slot "A" is then registered in the lens information table (see FIG. 1).

Figure 4:
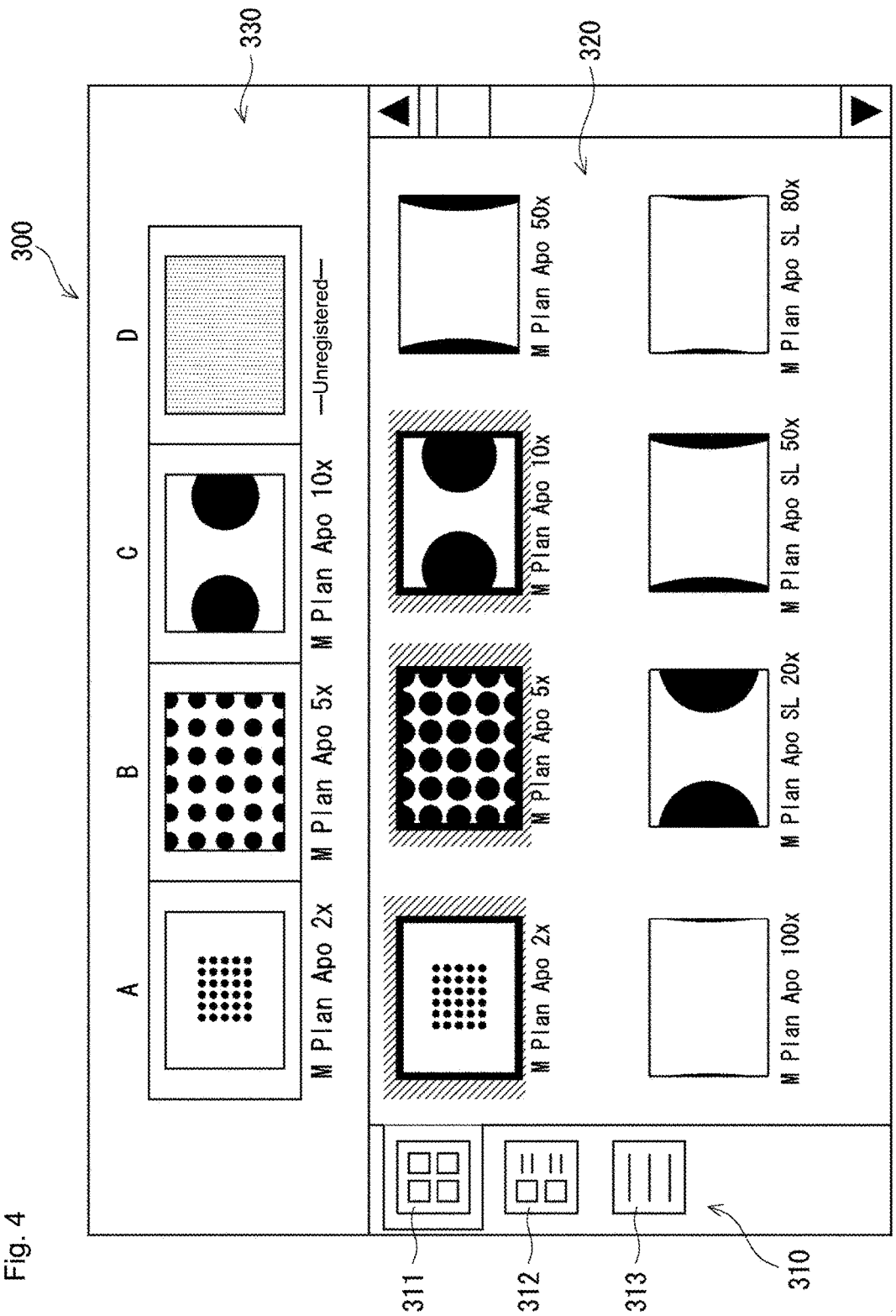
FIG. 4 illustrates the exemplary configuration of the lens selection GUI screen.

FIG. 4 illustrates a state where "M Plan Apo 5×" has been registered to the lens slot "B" and "M Plan Apo 10×" has been registered to the lens slot "C" in a similar manner.

A case is now considered where the user also wishes to use "M Plan Apo 50×" and has mounted "M Plan Apo 50×" to slot "D" of the revolver 18. The user finds "M Plan Apo 50×" in the directory display region 320, then drags and drops it into the display frame "D" in the mounted lens display region 330. At this point, when the host computer 60 detects the drag-and-drop operation by the user, "M Plan Apo 50×" is displayed in the display frame "D" in the mounted lens display region 330 and slot "D" is registered to "M Plan Apo 50×" in the lens information table (FIG. 1). However, the calibration of "M Plan Apo 50×" is expired. In such a case where a lens having an expired calibration is registered in the mounted lens display region 330, an emphasis display is provided indicating that it is expired. Examples of the emphasis display may include highlighting or a message display. In the example shown in FIG. 5, in addition to emphasis using a background color, a message is also displayed reading "Please calibrate prior to use." Examples of highlighting may include emphasis display of a portion having symbols or a sequence of letters being displayed with inverted colors, a background color being changed, or the like.

Figure 6:
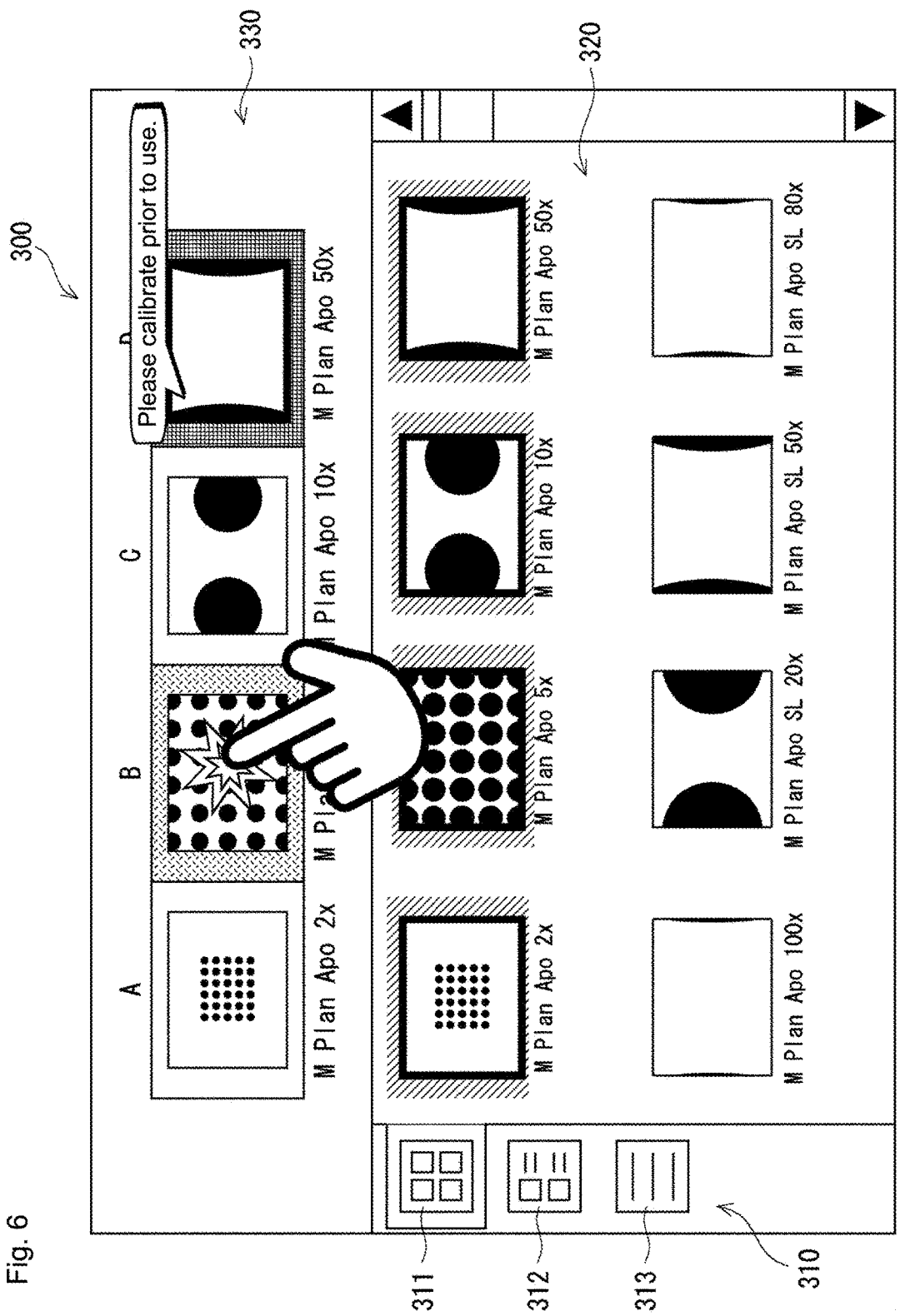
FIG. 6 illustrates an exemplary operation on the lens selection GUI screen.

Measurement is performed while the user switches between the four lenses mounted to the revolver 18. The user selects the lens to be used from among the registered lenses in the mounted lens display region 330. For example, the user taps twice in succession on one of the thumbnails displayed in the mounted lens display region 330 (FIG. 6). The revolver 18 then automatically rotates using electric drive, and the selected lens is placed in a state ready for use. In addition, an emphasis display indicating the lens that is currently in use is provided to the mounted lens display region 330. Examples of the emphasis display may include changing the background color. FIG. 6 illustrates a state where the "M Plan Apo 5×" mounted to slot "B" is selected for use.

(Variation of Display Formats)

Figure 7:
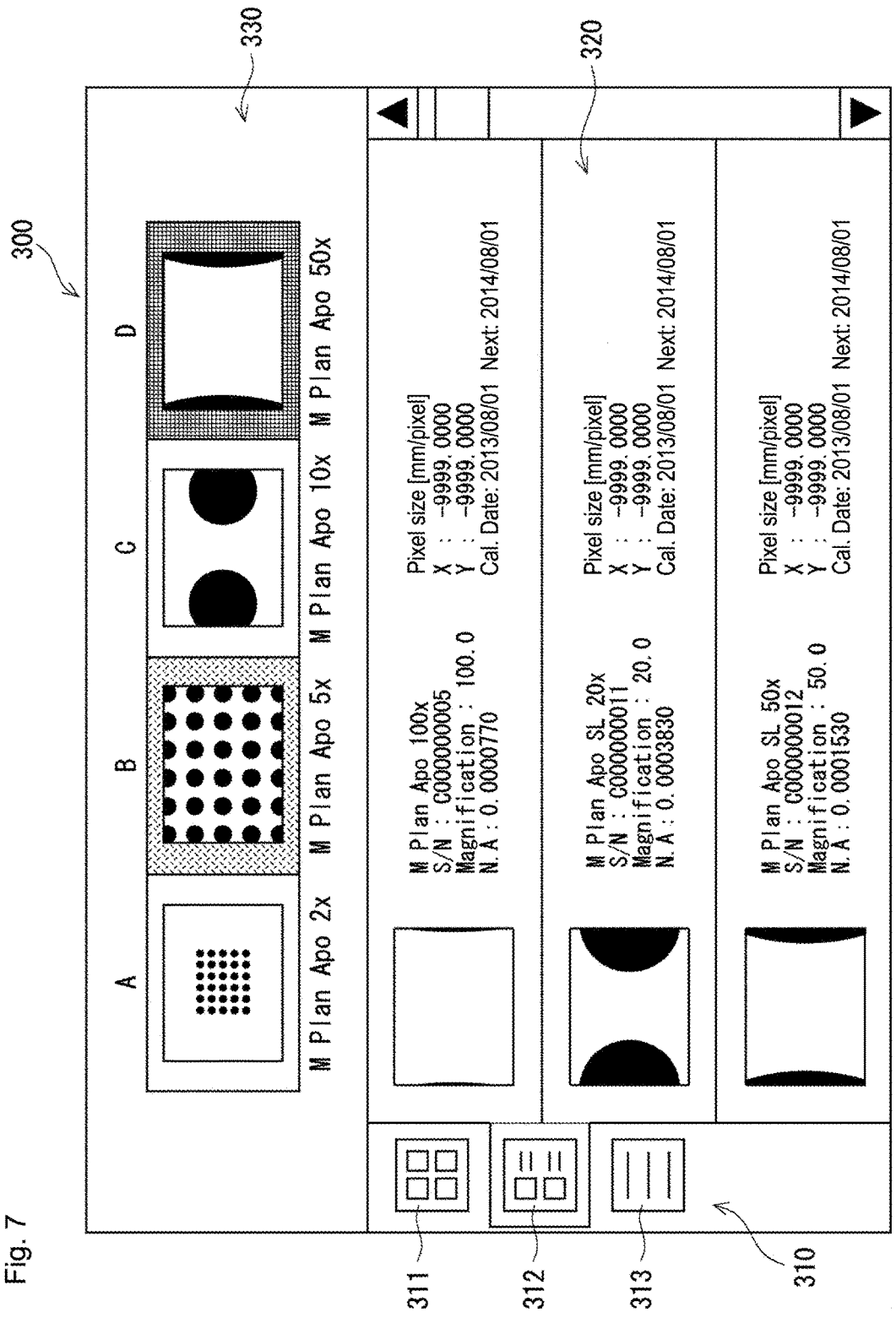
FIG. 7 illustrates a variation of a display on the lens selection GUI screen.

FIGS. 2 to 6 illustrate an exemplary thumbnail compendium format as the display format. FIG. 7 illustrates an exemplary screen layout for the detailed display format. When the detailed display format (312) is selected, detailed information for each lens is displayed in the directory display region 320 in addition to the thumbnails. In the example shown in FIG. 7, in addition to lens optical information such as magnification power, numerical aperture, and SN ratio, the detailed display format also displays calibration values, calibration date, and next scheduled calibration date. The next scheduled calibration date is equivalent to the "expiration date" registered in the lens information table.

Figure 8:
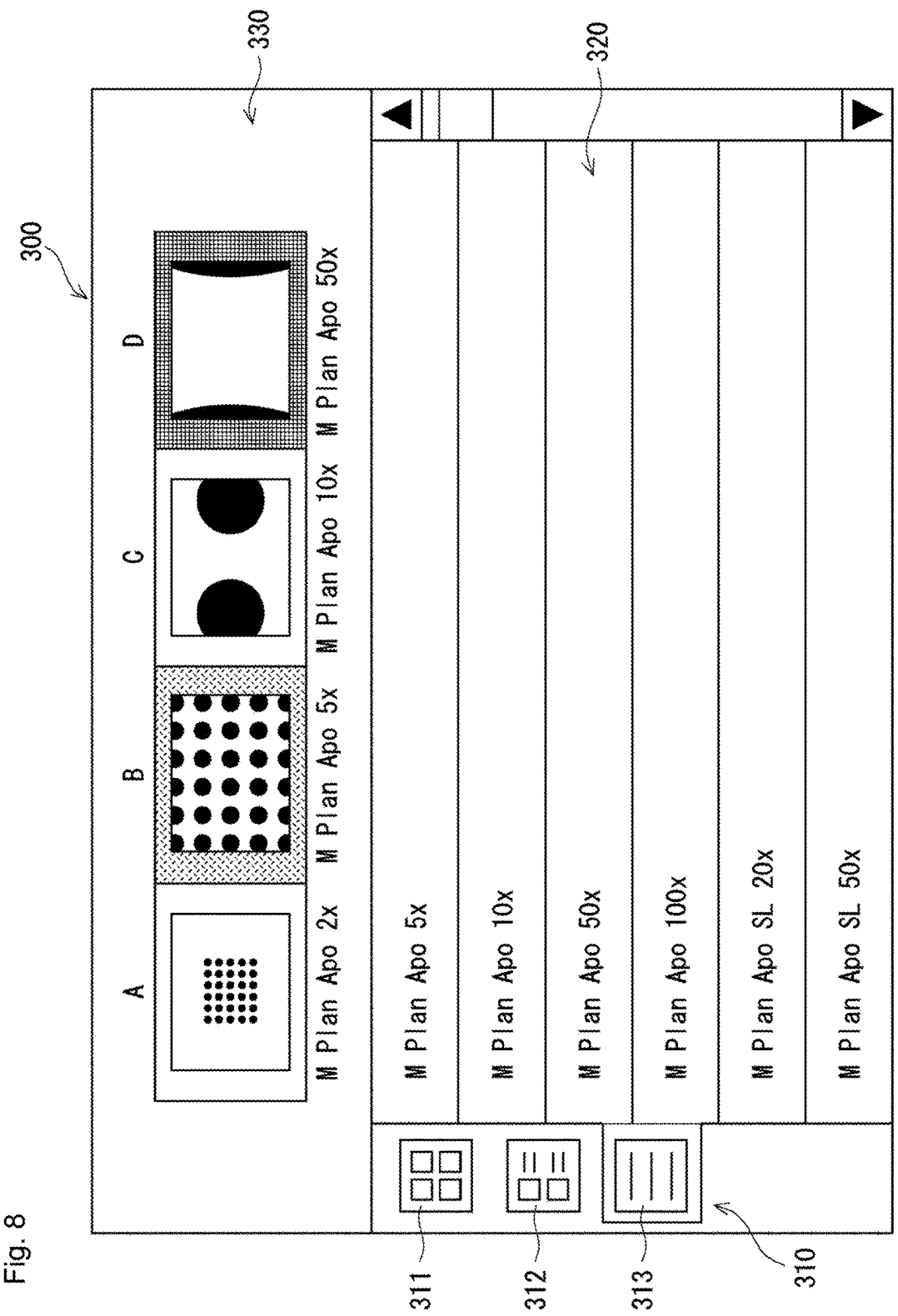
FIG. 8 illustrates a variation of the display on the lens selection GUI screen.

FIG. 8 illustrates an exemplary screen layout for the simplified display format. The simplified display format (313) has a simple screen configuration which simply lists lens names.

Naturally, a lens can be registered in the mounted lens display region 330 by a drag-and-drop operation from the directory display region 320 in the detailed display format (FIG. 7) and the simplified display format (FIG. 8), as well.

First Modification

Figure 5:
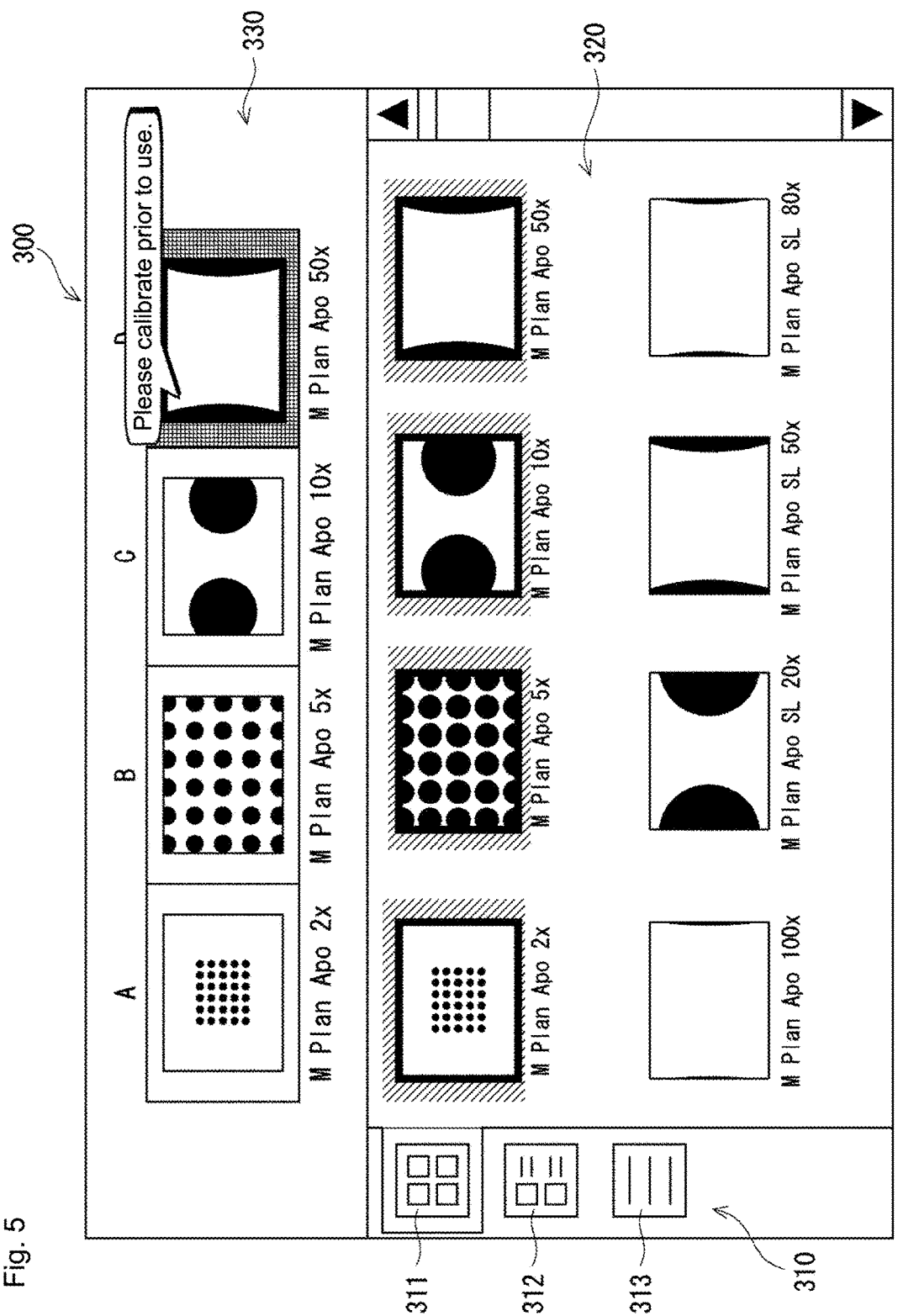
FIG. 5 illustrates the exemplary configuration of the lens selection GUI screen.
Figure 9:
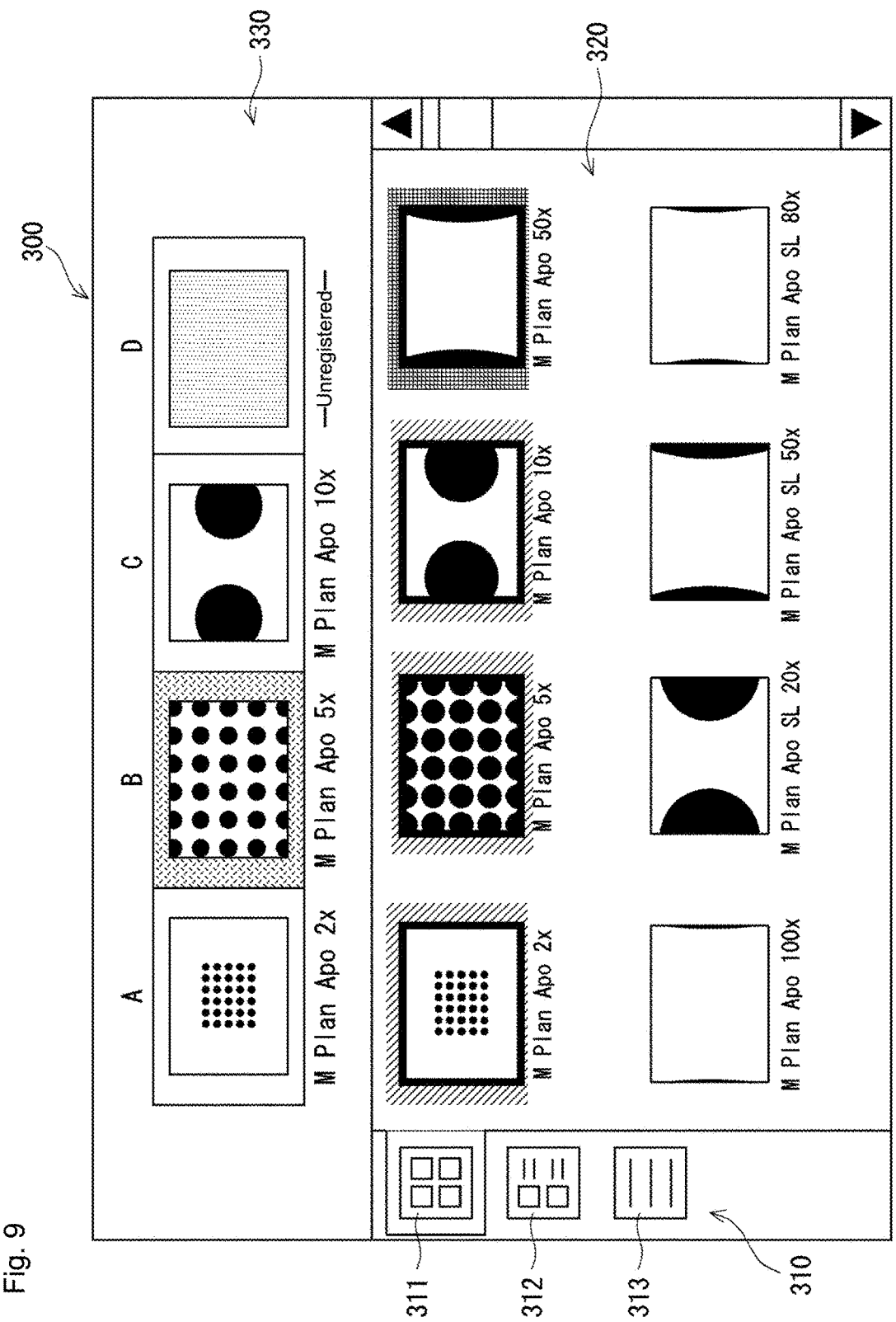
FIG. 9 illustrates a first modification.

In the above-described embodiment, when a lens is registered by performing a drag-and-drop operation from the directory display region 320 to the mounted lens display region 330, a display is provided reflecting the expiration date of the calibration (e.g., FIG. 5). In this regard, as a first modification, an emphasis display may be performed for a lens having an incorrect calibration value at the stage where the lens is displayed in the directory display region 320. In FIG. 9, an emphasis display is provided to "M Plan Apo 50×" in the directory display region 320. As a result, the user can recognize at a glance which lens or lenses have an expired calibration.

Moreover, this modification may be configured to differentiate between a lens having expired calibration values and a lens for which no calibration values are entered. Such differentiation may be achieved by a simple difference in color.

Second Modification

Figure 10:
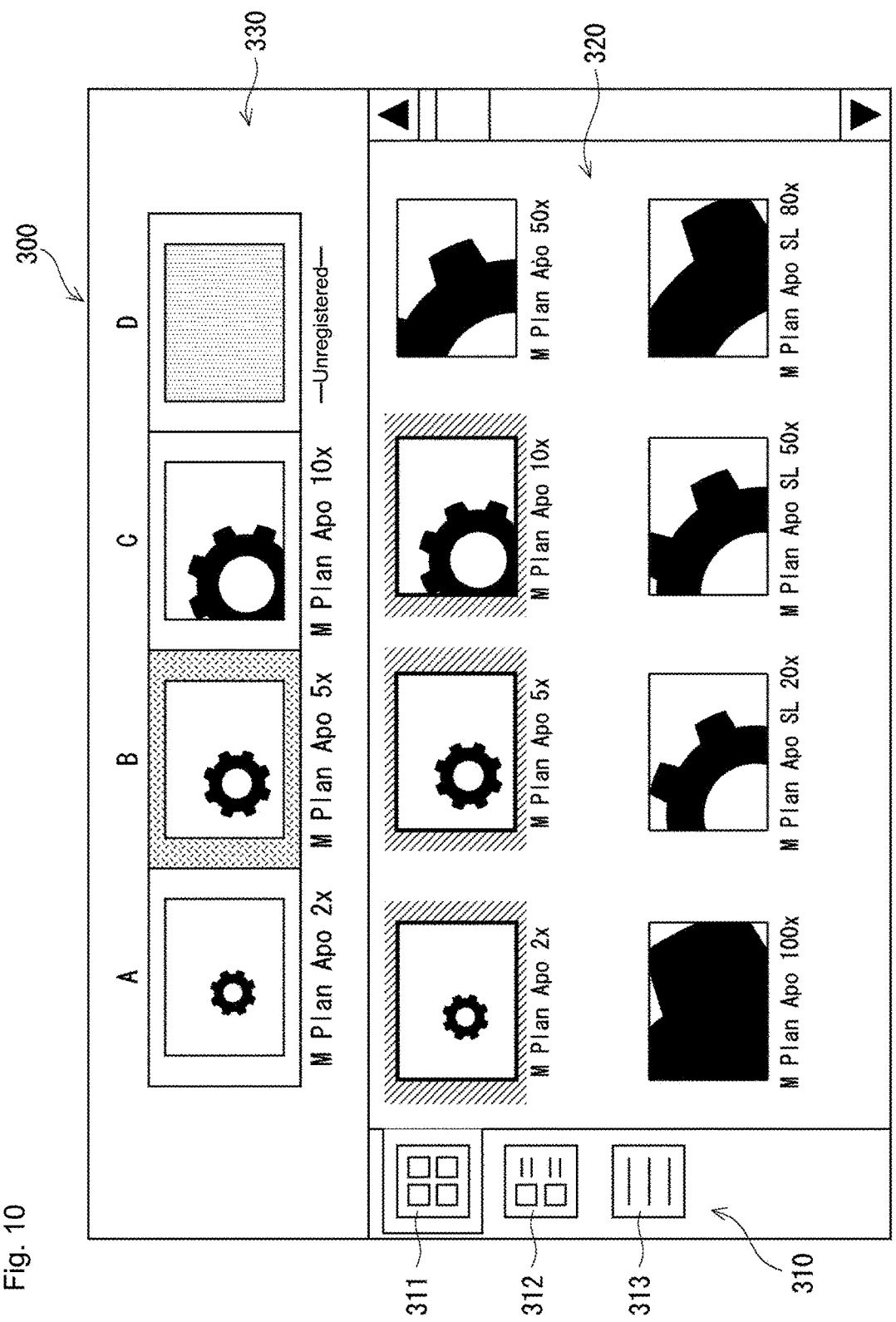
FIG. 10 illustrates a second modification.

In the first embodiment described above, a prearranged reference pattern is displayed as a thumbnail image in which the size of the pattern is adjusted to match the magnification power of each lens. As a second modification, an image currently being captured may be displayed as the thumbnail image corresponding to each lens, in which the size of the image is adjusted to match the magnification power of each lens. (Refer to FIG. 10.) Take "M Plan Apo 5×" as the lens currently in use capturing an image of a gear, for example. In such a case, image data of the gear currently being captured is displayed as a thumbnail corresponding to "M Plan Apo 5×" in the lens selection GUI screen 300 in the mounted lens display region 330 as well as in the directory display region 320. Moreover, image data of the gear is also displayed as a thumbnail corresponding to each of the other lenses. Specifically, an image corresponding to the magnification power of each lens is simulated based on the image data being captured by "M Plan Apo 5×." Simulation results are then displayed as a thumbnail for each lens. Accordingly, the user can immediately and intuitively understand what image can be obtained when switching lenses.

Third Modification

In the above-described embodiment, an image measuring device 2 was assumed in which a plurality of different types of lenses could be simultaneously mounted to the revolver 18. Naturally, there are also image measuring devices having a configuration in which only one lens can be mounted at a time. The present invention can be effectively applied to such a case, as well. One example is an image measuring device in which only one lens is used and the magnification power is changed by optical zoom or digital zoom. In such a case, calibration values must be found for each magnification power. Although the type of lens is the same, calibration values are found for each magnification power and are stored in a lens information table such as that shown in FIG. 11, for example.

Figure 12:
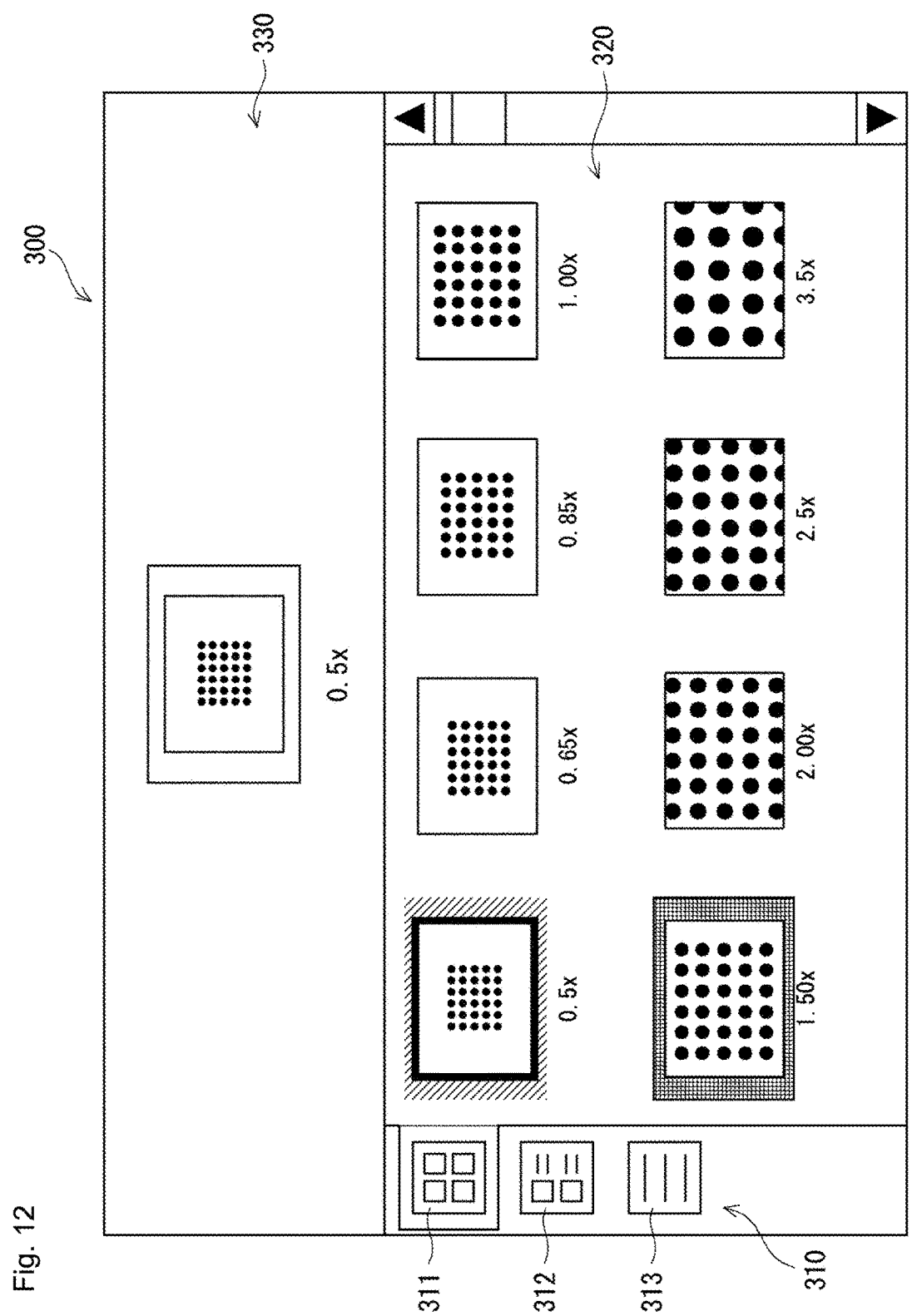
FIG. 12 illustrates the exemplary lens selection GUI screen according to the third modification.

Based on such a table, the lens selection GUI screen 300 such as that shown in FIG. 12 may be provided to the user. An overview of selectable magnification powers is displayed in the directory display region 320. When the thumbnail corresponding to the desired magnification power is moved to the mounted lens display region 330 by dragging and dropping, the magnification power in use can be changed. Magnification powers having expired calibration values may be highlighted in the directory display region 320, or highlighting or a message may be displayed when such a magnification power is dragged into the mounted lens display region 330.

Fourth Modification

Figure 13:
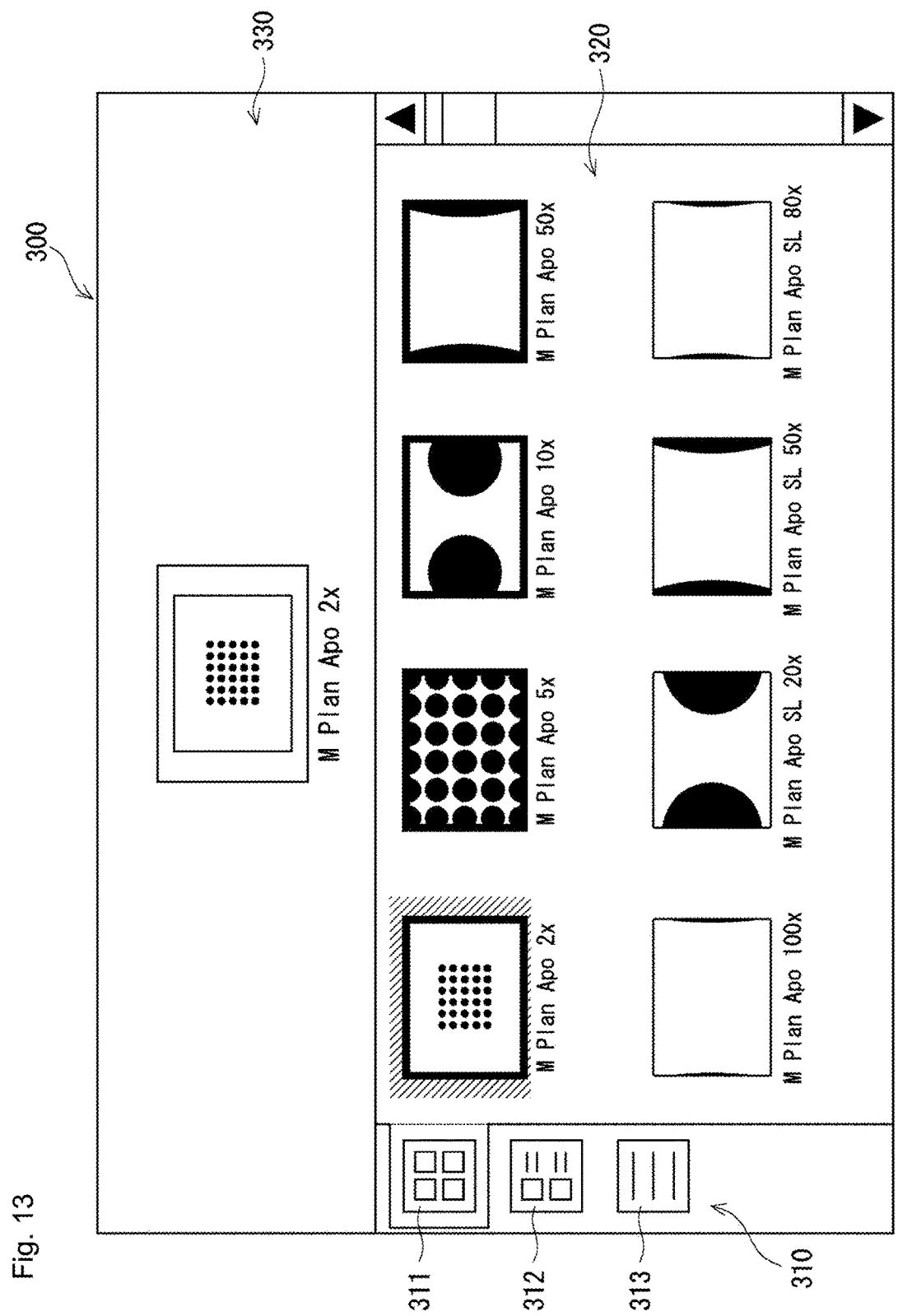
FIG. 13 illustrates a fourth modification.
Figure 14:
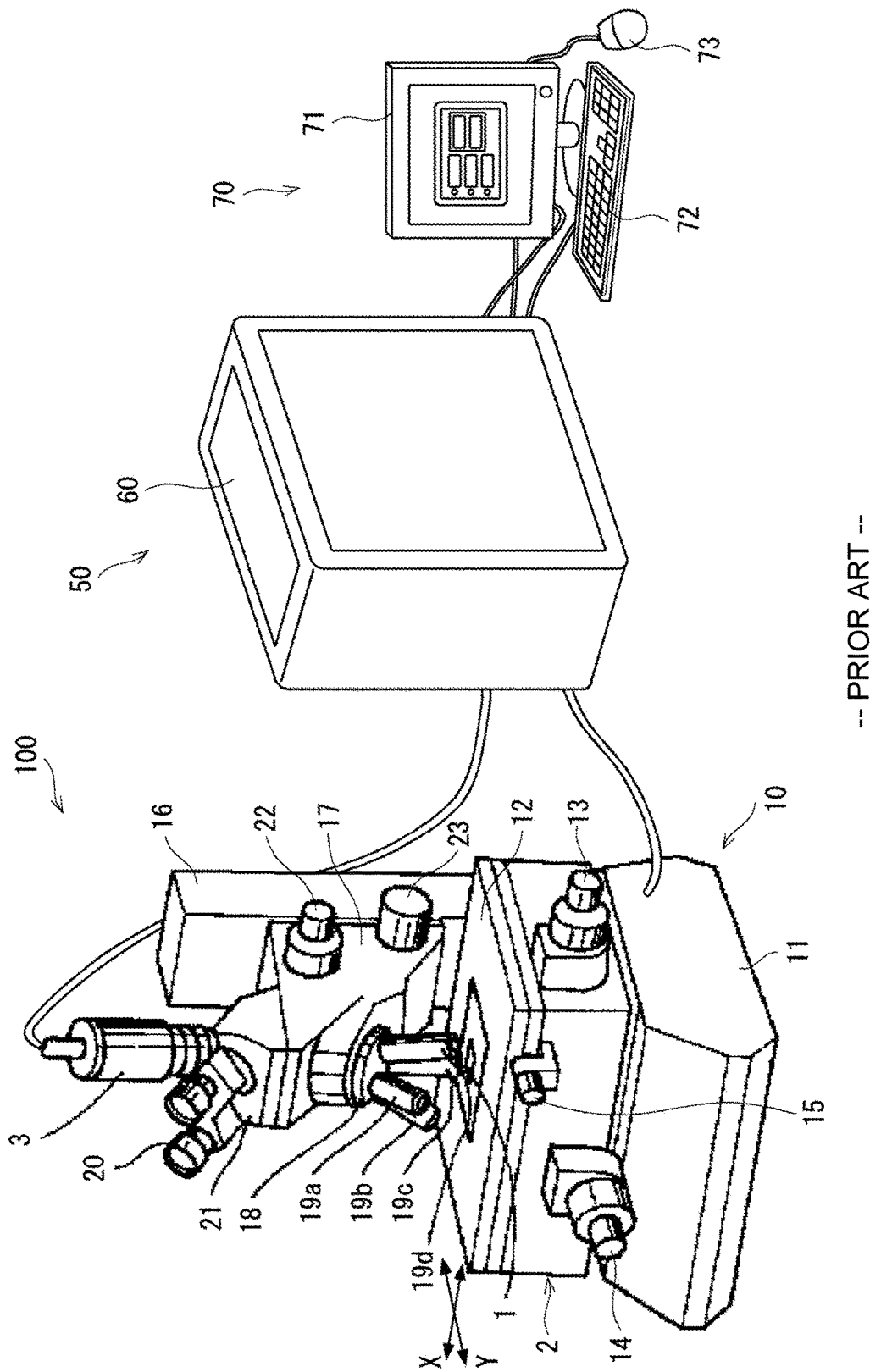
FIG. 14 illustrates a system configuration of an image measuring apparatus according to a conventional example.
Figure 15:
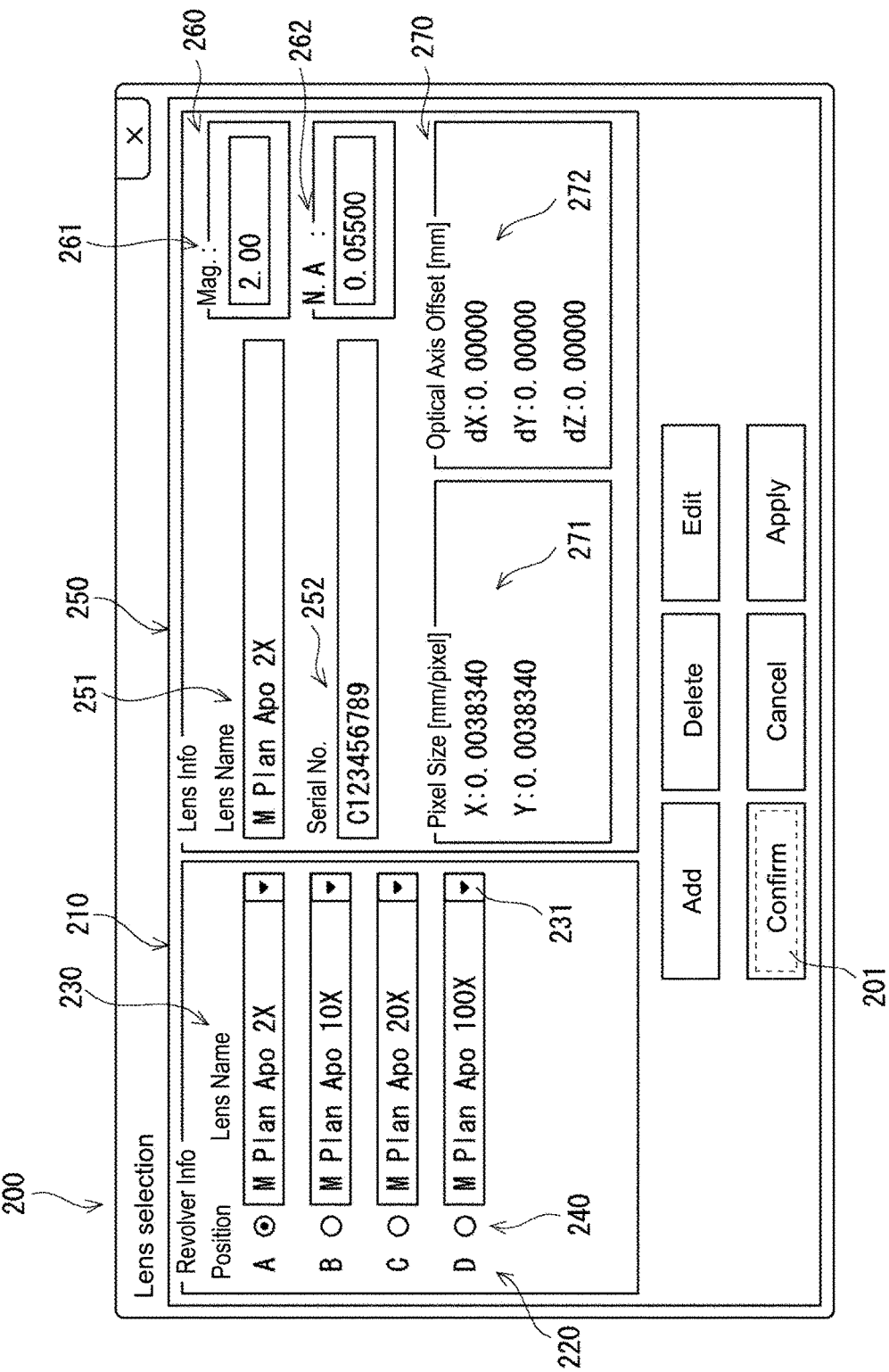
FIG. 15 illustrates an exemplary screen in a GUI according to a conventional example.

Naturally, there are also measurements of a type using an image measuring device capable of mounting only one lens and where the observation field is changed by switching out the lens, without using optical zoom or digital zoom. A screen configuration for such a case is readily analogized from the first embodiment. Whereas four lenses can be mounted to the revolver in the first embodiment, the fourth modification may be viewed as being capable of mounting only one. FIG. 13 offers a merely exemplary screen configuration.

Moreover, the present invention is not limited to the embodiments described above, and may be modified as needed without departing from the scope of the present invention. An image measuring apparatus GUI program may be stored in a non-volatile storage medium, or may be installed as needed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring apparatus comprising:
   an image measurer that
      holds a plurality of lenses with different lens magnification power for selection,
      selects a lens, among the plurality of lenses, to be set in an optical path for capturing an image, and
      obtains an image of a measured object using the lens set in the optical path;
   a display that displays the image obtained by the image measurer, displays a plurality of thumbnail images corresponding to the plurality of lenses, receives a selection of a thumbnail image corresponding to a target lens among the plurality of lenses, and displays an operation screen to a user; and a control circuit that
    detects the selection of the thumbnail image corresponding to the target lens,
    in response to the detection of the selection of the thumbnail image, determines whether a calibration value of the corresponding target lens has expired,
    when the calibration value of the target lens is determined to be expired, controls to display notification of expiry for the selected target lens,
    controls operations of the image measurer and the display, and
    controls to communicate to the user, via the display, that at least one of the plurality of lenses has an expired calibration value,
    wherein each of the plurality of thumbnail images indicate a particular magnification power,
    wherein the operation screen comprises:
        a directory display region that displays a directory of the plurality of lenses contemporaneously held in the image measurer along with corresponding magnification powers; and
        a mounted lens display region that displays information of a set of lenses selected, from the plurality of lenses, to be placed on a revolver, each lens in the set of lenses selected configured to be set in the optical path via the revolver, and wherein:
        when the control circuit detects that an image, symbol, or sequence of letters corresponding to one of the plurality of lenses displayed in the directory display region has been moved to the mounted lens display region by a drag-and-drop operation, the control circuit registers the one of the plurality of lenses as a lens included in the set of lenses, and
        in a case where the one of the plurality of lenses has an expired calibration value, the control circuit communicates to the user that the calibration value is expired.

2. The image measuring apparatus according to claim 1, wherein, when the selected lens is determined to have the expired calibration value, the control circuit communicates to the user that the calibration value is expired for the selected lens.

3. The image measuring apparatus according to claim 1, wherein, in a case where the one of the plurality of lenses has an expired calibration value, the control circuit communicates to the user in the directory display region, using the display, that the one of the plurality of lenses has an expired calibration value.

4. The image measuring apparatus according to claim 1, wherein the display displays to the user, using highlighting or a message, that the one of the plurality of lenses has an expired calibration value.

5. The image measuring apparatus according to claim 2, wherein the display displays to the user, using highlighting or a message, that the one of the plurality of lenses has an expired calibration value.

6. The image measuring apparatus according to claim 3, wherein the display displays to the user, using highlighting or a message, that the one of the plurality of lenses has an expired calibration value.

7. The image measuring apparatus according to claim 1, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

8. The image measuring apparatus according to claim 2, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

9. The image measuring apparatus according to claim 3, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

10. The image measuring apparatus according to claim 4, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

11. The image measuring apparatus according to claim 5, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

12. The image measuring apparatus according to claim 6, wherein:
    each thumbnail image displays one of an image in which a size of a prearranged reference pattern is adjusted to match each lens magnification power corresponding to each of the plurality of lenses, and an image in which a size of an image currently being captured is adjusted to match each of the lens magnification power.

13. At least one tangible, one non-transitory computer-readable medium storing an executable set of instructions for an image measuring apparatus, the image measuring apparatus including:
    an image measurer that
        holds a plurality of lenses with different lens magnification power for selection,
        selects a type of lens, among the plurality of lenses, to be set in an optical path for capturing an image, and
        obtains an image of a measured object using the type of lens set in the optical path;
    a display that displays the image obtained by the image measurer, displays a plurality of thumbnail images corresponding to the plurality of lenses, receives a selection of a thumbnail image corresponding to a target lens among the plurality of lenses, and displays an operation screen to a user; and
    a control circuit that
        detects the selection of the thumbnail image corresponding to the target lens,
        in response to the detection of the selection of the thumbnail image, determines whether a calibration value of the corresponding target lens has expired, when the calibration value of the target lens is determined to be expired, controls to display notification of expiry for the selected target lens,
controls operations of the image measurer and the display, and
wherein the instructions, when executed by a processor, causes the processor to execute operations comprising:
performing display control, on the display, by being programmed into the control circuit of the image measuring apparatus,
retrieving, from the control circuit, information in which a calibration value and an expiration date of the calibration value are recorded for each of the plurality of lenses, and
communicating to the user, via the display, that the one lens and a lens magnification power has an expired calibration value,
wherein each of the plurality of thumbnail images indicate a particular magnification power,
wherein the operation screen comprises:
a directory display region that displays a directory of the plurality of lenses contemporaneously held in the image measurer along with corresponding magnification powers; and
a mounted lens display region that displays information of a set of lenses selected, from the plurality of lenses, to be placed on a revolver, each lens in the set of lenses selected configured to be set in the optical path via the revolver, and wherein:
when the control circuit detects that an image, symbol, or sequence of letters corresponding to one of the plurality of lenses displayed in the directory display region has been moved to the mounted lens display region by a drag-and-drop operation, the control circuit registers the one of the plurality of lenses as a lens included in the set of lenses, and
in a case where the one of the plurality of lenses has an expired calibration value, the control circuit communicates to the user that the calibration value is expired.

14. The image measuring apparatus according to claim 1, wherein the mounted lens display region includes a same number of spots available for registering of lenses as a number of spots available on the revolver for holding of lenses.

15. The image measuring apparatus according to claim 14, wherein more than one lens is selected to be registered in the mounted lens display region.

16. The image measuring apparatus according to claim 14, wherein the number of spots displayed as being available for registering of lenses in the mounted lens display region is less than a number of the plurality of lenses displayed in the directory display region.

* * * * *